United States Patent [19]

Tsuno

[11] Patent Number: 4,620,769
[45] Date of Patent: Nov. 4, 1986

[54] IMAGE OBSERVATION SYSTEM

[75] Inventor: Koichi Tsuno, Osaka, Japan

[73] Assignee: Sumitomo Electric Industries, Ltd., Osaka, Japan

[21] Appl. No.: 564,928

[22] Filed: Dec. 23, 1983

[30] Foreign Application Priority Data

Dec. 29, 1982 [JP] Japan ................. 57-232458

[51] Int. Cl.⁴ ................................ G02B 6/06
[52] U.S. Cl. ...................... 350/96.26; 350/96.25; 128/6
[58] Field of Search ............ 350/96.24, 96.25, 96.26, 350/423, 243; 128/6, 303.1

[56] References Cited

U.S. PATENT DOCUMENTS

| 3,880,148 | 4/1975 | Kanehira et al. | 350/96.26 X |
| 4,042,823 | 8/1977 | Decker et al. | 350/96.26 X |
| 4,286,839 | 9/1981 | Ilzig et al. | 350/96.24 |
| 4,444,462 | 4/1984 | Ono et al. | 350/96.25 |

FOREIGN PATENT DOCUMENTS 53-108459 9/1978 Japan ................. 350/96.26

Primary Examiner—William L. Sikes
Assistant Examiner—Frank González
Attorney, Agent, or Firm—Cushman, Darby and Cushman

[57] ABSTRACT

Disclosed is an image observation system which employs a bellows expanded and contracted by fluid pressure to move an optical element, such as an image pick-up lens, within an image pick-up adapter. The bellows, which is operatively associated with the optical element, is communicated with a manually operated fluid pressure drive unit by a fluid pressure transfer pipe. Manipulating the drive unit forces a fluid into or withdraws a fluid from the bellows via the transfer pipe to expand or contract the bellows, thereby controlling the position or attitude of the optical element located at the end of the image fiber.

6 Claims, 17 Drawing Figures

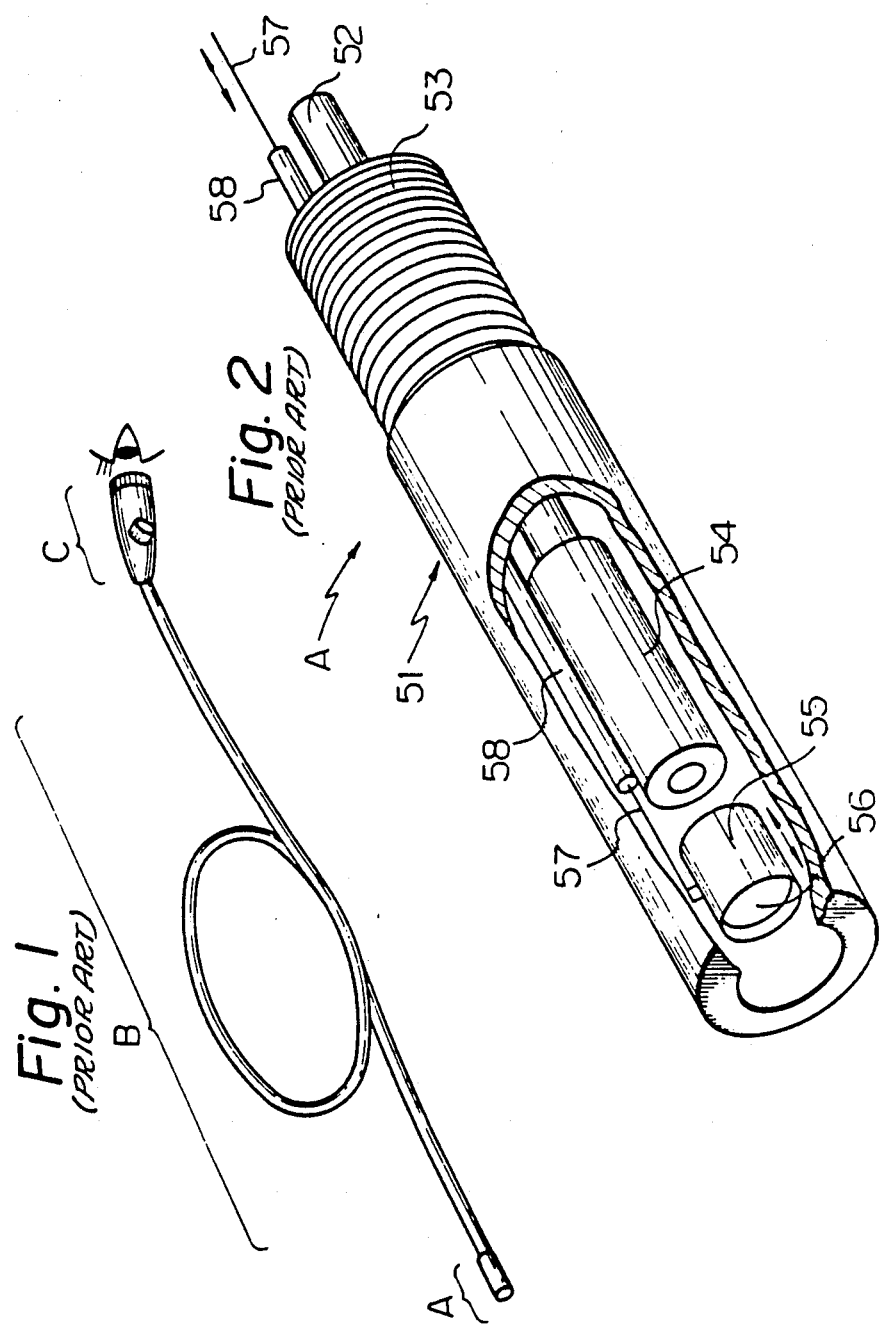

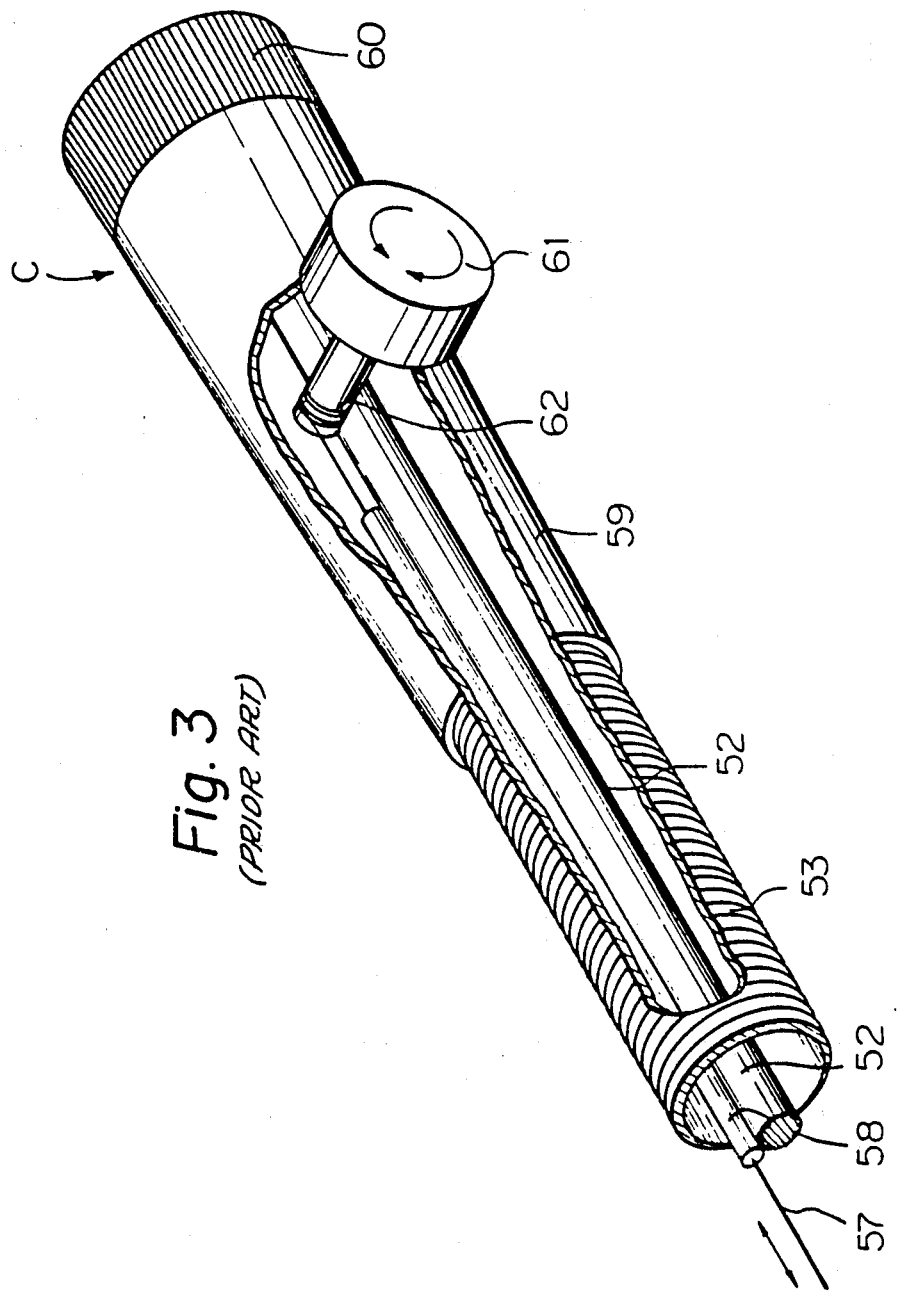

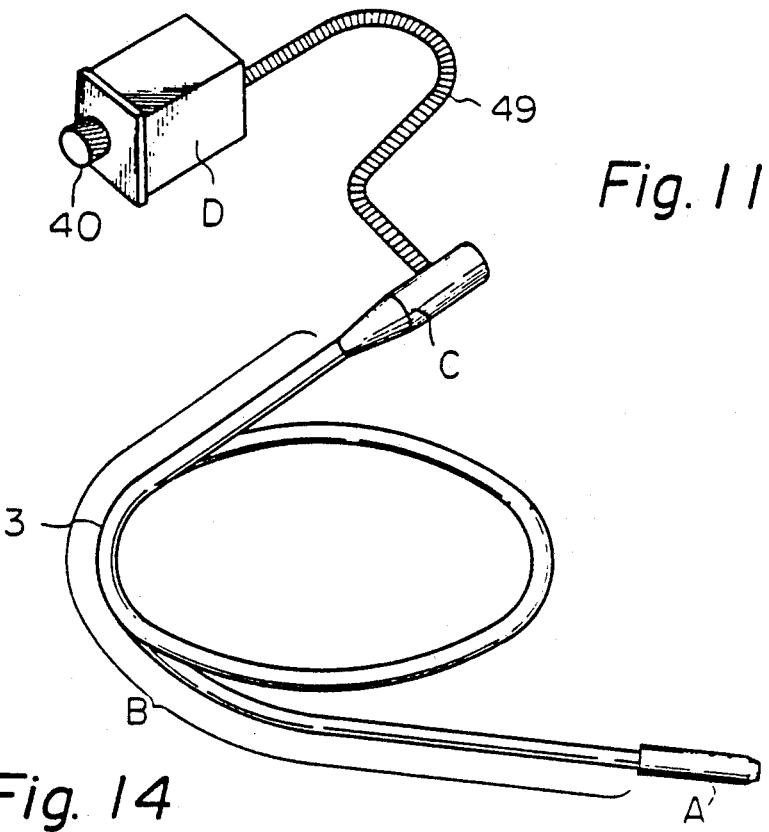
Fig. 11
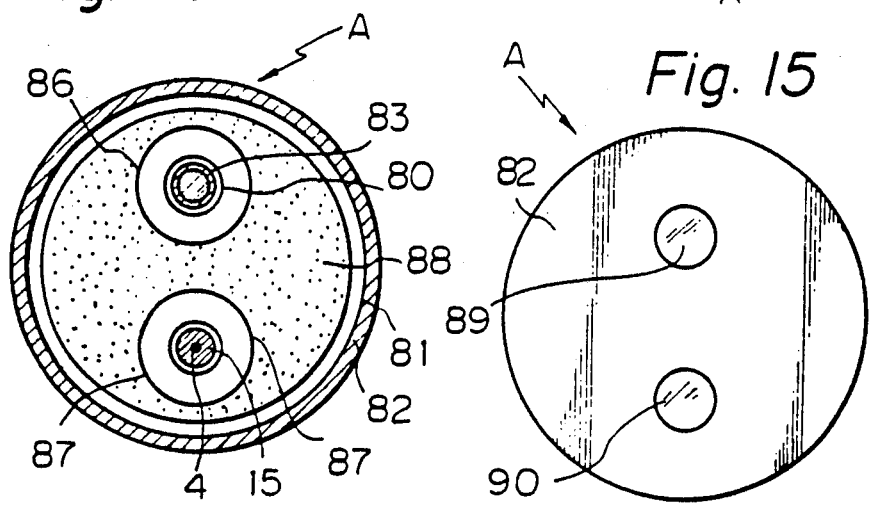
Fig. 14
Fig. 15

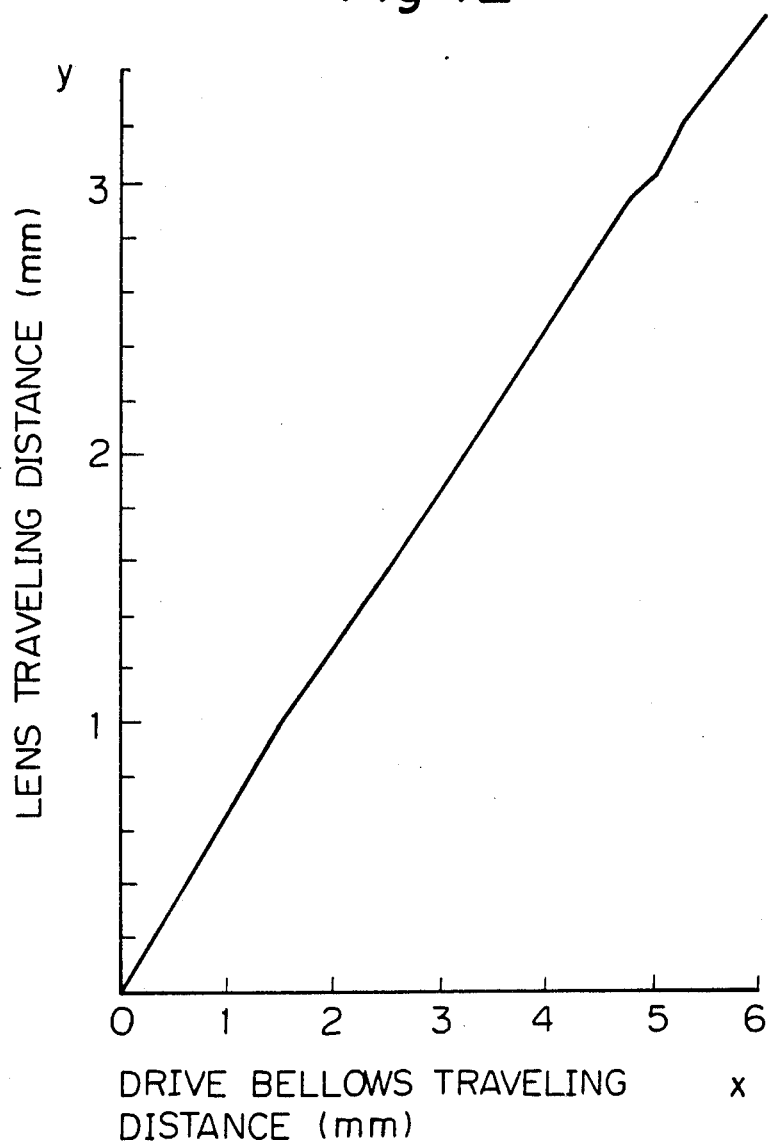

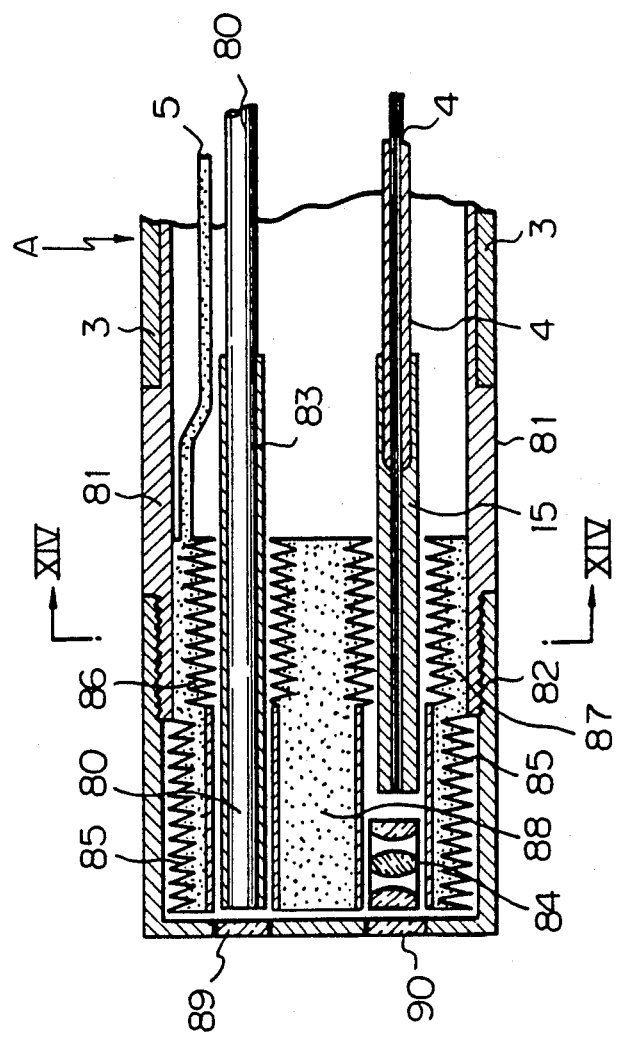

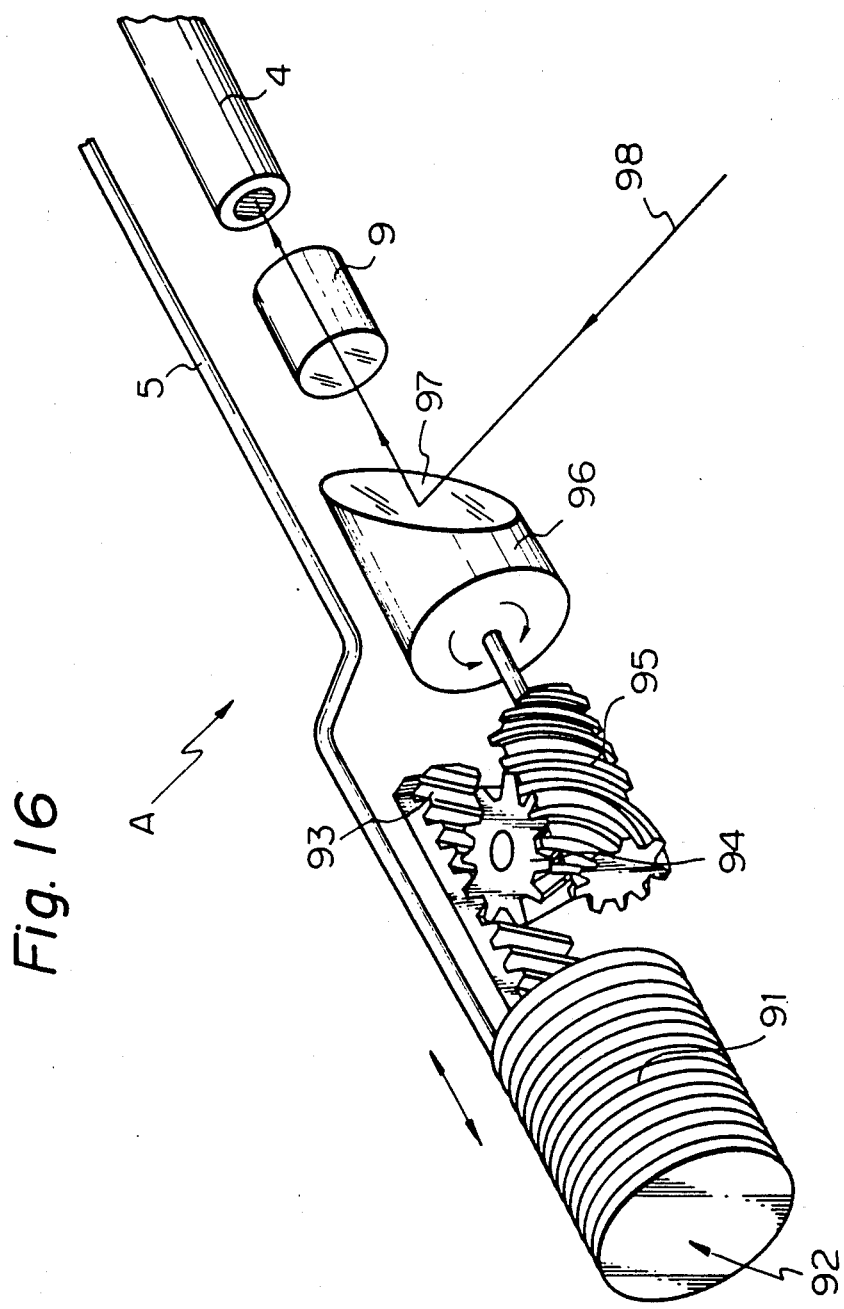

IMAGE OBSERVATION SYSTEM

BACKGROUND OF THE INVENTION

This invention relates to an image observation system wherein image fiber is used to transmit an image. An image observation system using image fiber finds use in a wide variety of medical and industrial fields. For example, medical fiberscopes are employed in gastrocameras and bronchoscopes, while industrial fiberscopes are used to inspect the inner surfaces of pipes as well as machine interiors.

The present invention concerns an apparatus for positionally displacing the image pick-up lens, or for shifting the image pick-up direction, in an image pickup adapter provided at the distal end of a fiberscope.

DESCRIPTION OF THE PRIOR ART

The conventional system of the foregoing type, some examples of which will now be described, possesses a number of disadvantages. A fiberscope includes an image pick-up lens for forming the image of an object on the end face of an image fiber, which serves to transmit the image through the scope. In one example of such a fiberscope, the image pick-up lens is fixed with respect to the image pick-up adapter, so that the distance between the lens and the end face of the image fiber is not capable of being adjusted. One disadvantageous result of such an arrangement is that the image pick-up adapter must be so positioned relative to the object as to maintain a constant distance between itself and the object. Another is that the image of the object is fixed in size, with no possibility of enlargement or reduction. Accordingly, a variety of improved fiberscopes in which the image pick-up lens is movable back and forth to permit focusing have been developed and put into use. In one exemplary arrangement, the lens is moved through use of a wire. However, such a configuration has limited optical transmission distance (on the order of several meters at most) and can be utilized solely in fiberscopes which do not flex with a large curvature.

A solution to the foregoing problems has already been proposed by the inventor in the specification of Japanese Patent Application No. 1981-84479 (Japanese Patent Application Laid-Open No. 1982-201376), in which hydraulic (oil) pressure in an oil piston system is used in place of the wire. The use of hydraulic pressure eliminates the problem of friction associated with the wire and permits the use of a bendable section having a small radius of curvature. In addition, a precision linear relationship may be established between the amount of manual adjustment and the amount by which the image pick-up lens is shifted in the image pick-up adapter. However, a problem encountered in the oil piston system is the tendency for an O-ring to be corroded by the oil, as well as a loss of smooth movement caused by sluggish piston action when a perfect seal is provided.

SUMMARY OF THE INVENTION

Accordingly, a principal object of the present invention is to provide a fiberscope devoid of the foregoing disadvantages encountered in the prior art.

According to the present invention, the foregoing object is attained by providing an image observation system which employs a bellows expanded and contracted by fluid pressure to move an optical element, such as an image pick-up lens or visual field adjusting mirror, within an image pick-up adapter.

More specifically, an image observation system according to the present invention is provided with one or a plurality of expandable and contractible bellows disposed within an image pick-up adapter. A fluid transfer tube in juxtaposition with an image fiber communicates these bellows with a fluid pressure drive adapter connected to a direct, viewing adapter. Within the image pick-up adapter, the moving sides of the bellows are joined to an image pick-up lens, a mirror or to the adapter itself. The bellows are expanded or contracted by the fluid pressure drive unit in the vicinity of the direct viewing adapter, thereby controlling the position or pointing direction of the image-pick up lens or mirror relative to the image fiber, the lens and mirror being disposed in the image pick-up adapter at the front end of the image fiber.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a perspective view of a fiberscope according to an example of the prior art;

FIG. 2 is a perspective view of an image pick-up adapter constituting part of the conventional fiberscope of FIG. 1;

FIG. 3 is a perspective view of a picture receiving adapter constituting part of the conventional fiberscope of FIG. 1;

FIG. 11 is an overall view of the image observation system of the present invention;

FIG. 12 is a graph of experimental results according to an embodiment of the present invention, the graph showing the relation between the traveling distance x of a drive bellows and the displacement y of an image pick-up lens for an oil tube length of 10 m;

FIG. 13 is a longitudinal sectional view of a second embodiment of an image pick-up adapter according to the present invention;

FIG. 14 is a sectional view of the image pick-up adapter of FIG. 13 taken along the line XIV—XIV;

FIG. 15 is a front view of the image pick-up adapter of FIG. 13;

FIG. 16 is a perspective view of an embodiment of the invention having a visual field rotating mechanism, the arrangement being shown after removal of a case.

PREFERRED EMBODIMENT OF THE INVENTION

Figure 4:
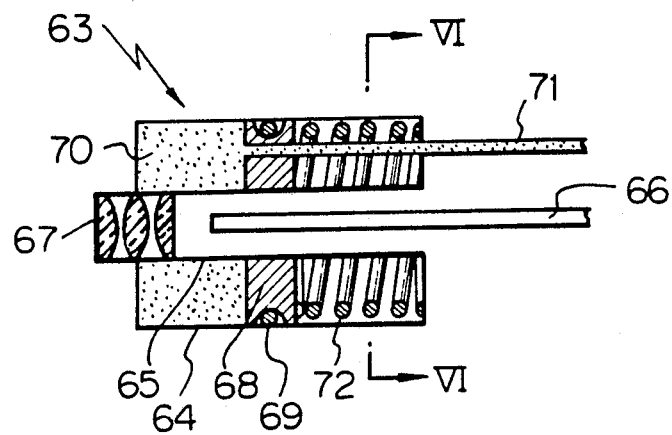
FIG. 4 is a longitudinal sectional view of an image pick-up adapter operated by a piston and hydraulic pressure as previously disclosed in an application filed by the inventor.

Before describing an embodiment of the invention, examples of the prior art will be explained in greater detail.

FIGS. 1 through 3 illustrate an example of a conventional fiberscope equipped with a focus adjusting mechanism using a wire. In the perspective view of FIG. 1 showing the fiberscope in its entirety, the fiberscope is shown to comprise a distal end image pick-up adapter A which is to be pointed at the object under observation, an elongate, flexible transmission section B composed of a bundle of optical fibers for direct transmission of the image of the object (image fiber), and a picture receiving adapter C which allows the operator to view the image of the object directly. The image pick-up adapter A is provided with an image pick-up lens for forming the image of the object. The picture receiving adapter C is provided with a picture receiving lens for enlarging the image.

The partially cut away perspective view of FIG. 2 shows the image pick-up adapter A. The image pick-up adapter has a cylindrical main body 51 into one end of which an image fiber 52 is inserted, and is fixedly secured to the front end of a flexible pipe 53 covering the image fiber 52. Fitting snugly onto the front end of the image fiber 52 within the image pick-up adapter 51 is a cylindrical sleeve 54. The image pick-up adapter 51 is further provided with an image pick-up lens 56 supported forwardly of the image fiber sleeve 54 by a lens holder 55. A wire 57 is used to move the image pick-up lens 56 back and forth in order to adjust the focus. The wire 57, which passes completely through a wire tube 58 disposed within the flexible pipe 53, has its front end secured to the lens holder 55 and its back end wound round a pulley 62 of a focusing knob 61 constituting part of the picture receiving adapter C.

The picture receiving adapter C is shown in detail in the partially cut away perspective view of FIG. 3. The picture receiving adapter C has a cylindrical main body 59 which is fixedly secured to the back end of the flexible pipe 53, and which receives the back end of the image fiber 52, wire 57 and wire tube 58. Provided on the back of the picture receiving adapter 59 is a picture receiving lens holder 60 which secures a picture receiving lens (not shown) for image enlargement. As mentioned above, the back end of the wire 57 is wound round the pulley 62 of the focusing knob 61.

In operation, turning the focusing knob 61 manually moves the wire 57 back and forth as the wire is taken up and paid out by the pulley 62. The lens holder 55 is moved back and forth by the wire 57, which travels back and forth within the immobile wire tube 58. Thus, the position of the image pick-up lens 56 can be adjusted by rotating the focusing knob 61 clockwise or counterclockwise. The permits the operator to adjust the focus while he observes the image in the picture receiving adapter C.

A fiberscope generally finds use in the observation of areas that are not readily accessible by hand. For example, fiberscopes are commonly employed to inspect the interiors of pipes and machines, and to examine the human gastrointestinal tract.

In the foregoing example of the prior art, the wire-operated focus adjustment mechanism, while allowing focusing to be performed by turning the manually operated focusing knob 61, is accompanied by a number of drawbacks. The most serious of these is friction between the wire 57 and the wire tube 58 accommodating the wire. The frictional force developed in fiberscopes of great length is of considerable magnitude and hinders the movement of the wire. The result is difficulty in focusing. Since the transmission section B and flexible pipe 53 are often bent and flexed to reach the object under observation, the frictional force produced between the wire 57 and wire tube 58 assumes an even larger magnitude when the fiberscope has a small radius of curvature. A larqe frictional force not only makes it difficult to move the wire 57 back and forth but is also known to stretch or elongate the wire. Such stretching of the wire upsets the linear relationship between the amount of rotation of the focusing knob 61 and the amount of lens displacement back and forth, so that these two quantities are no lonoer proportional. It should be noted that this non-linear relationship between the amount of focusing knob adjustment and the amount of wire displacement also is brought about when the transmission section B is in a bent or curved state. Because of these difficulties, the wire-operated configuration can only be used in fiberscopes having a short transmission section B. Such fiberscopes are not designed to be bent at extreme angles and have a length of several meters.

Figure 5:
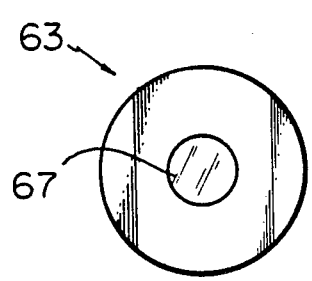
FIG. 5 is a front view of the image pick-up adapter.
Figure 6:
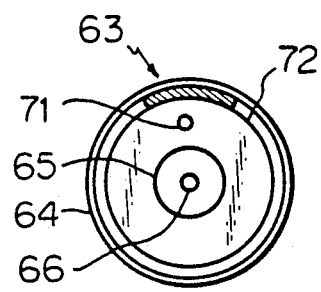
FIG. 6 is a sectional view of the image pick-up adapter of FIG. 4 taken along line VI—VI.

An improvement upon the wire-operated arrangement is illustrated in FIGS. 4 through 6, which illustrate an image pick-up adapter operated by hydraulic pressure, as previously proposed by the inventor. FIG. 4 is a sectional view, FIG. 5 a frong view, and FIG. 6 a sectional view taken along the line VI—VI of FIG. 4.

The image pick-up adapter, shown generally at number 63, comprises, in combination, an outer cylinder 64 and an inner cylinder 65 defining an intervening space which is tightly sealed. An image fiber 66 is inserted into the inner cylinder 65 from the back end thereof. An image pick-up lens 67 is secured to the front end of the inner cylinder 65. Provided slidably between the inner cylinder and outer cylinder 64 is a piston 68 having a disk-shaped configuration. An O-ring 69 forms a seal between the outer wall of the piston 68 and the inner surface of the outer cylinder 64.

Defined between the outer cylinder 64 and inner cylinder 65 on the front side of the piston 68 is an oil-filled chamber 70. A continuous oil tube 71, which extends from the rearwardly located picture receiving adapter C, passes through an aperture in the piston 68 and communicates with the oil chamber 70. A spring 72 is loaded at the back of the piston 68 and urges the image pick-up adapter 63 to the rear.

The arrangement is such that the image pick-up lens 67 will come to rest at an equilibrium position decided by balance between the pressure of the oil and the urging force applied by the spring 72. An oil drive unit, which is provided in the proximity of the rearwardly located picture receiving adapter C, controls the oil feed to move the image pick-up lens 67.

The foregoing oil piston system is disadvantageous in that the O-ring 69 tends to be corroded by the oil, and in that piston movement is sluggish, rather than smooth, when a perfect oil seal is achieved.

To overcome these shortcomings encountered in the foregoing proposal, the present invention relies upon a freely expanding and contracting bellows, rather than a piston, to shift such optical elements as a lens or mirror inside the image pick-up adapter.

Figure 7:
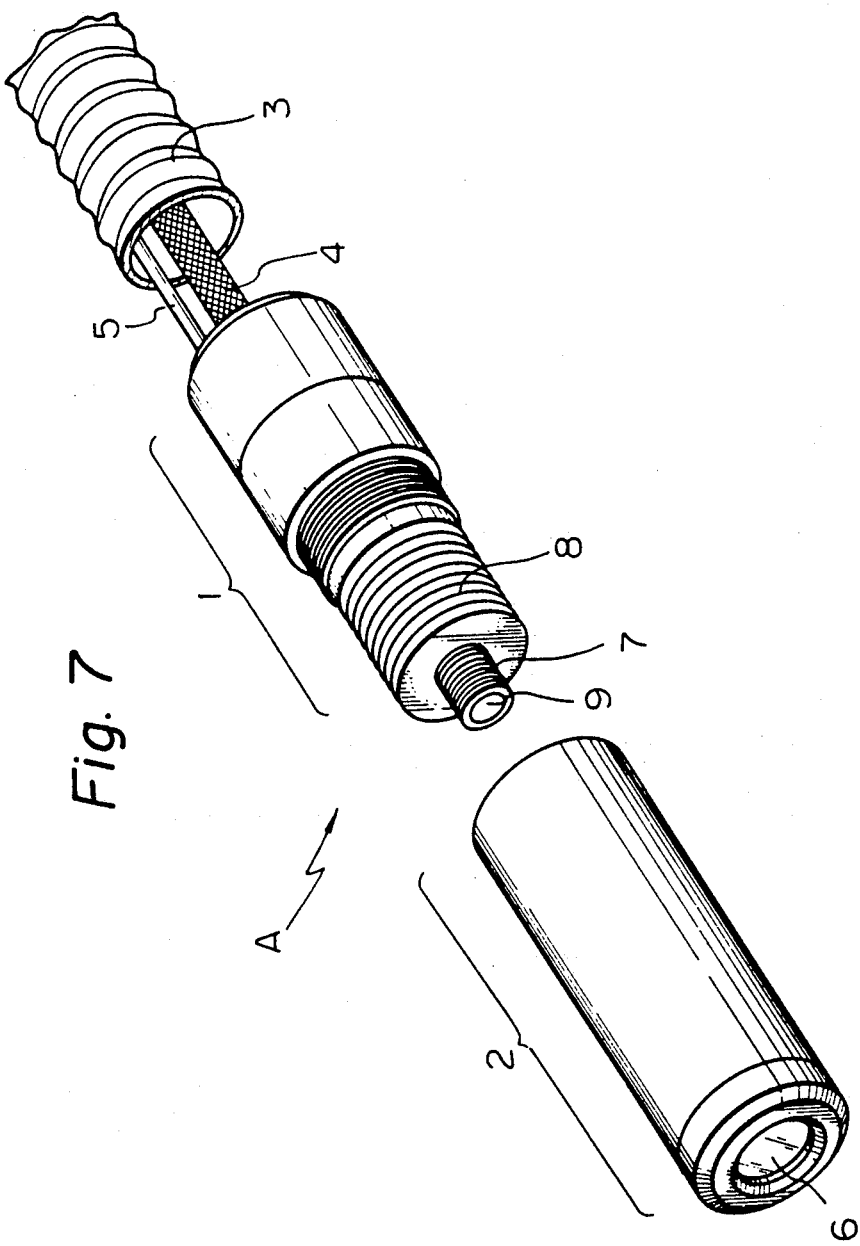
FIG. 7 is an exploded perspective view showing an image pick-up adapter in a first embodiment of an image observation system according to the present invention.

Reference will now be had to FIGS. 7 onward to describe embodiments of the present invention.

Figure 8:
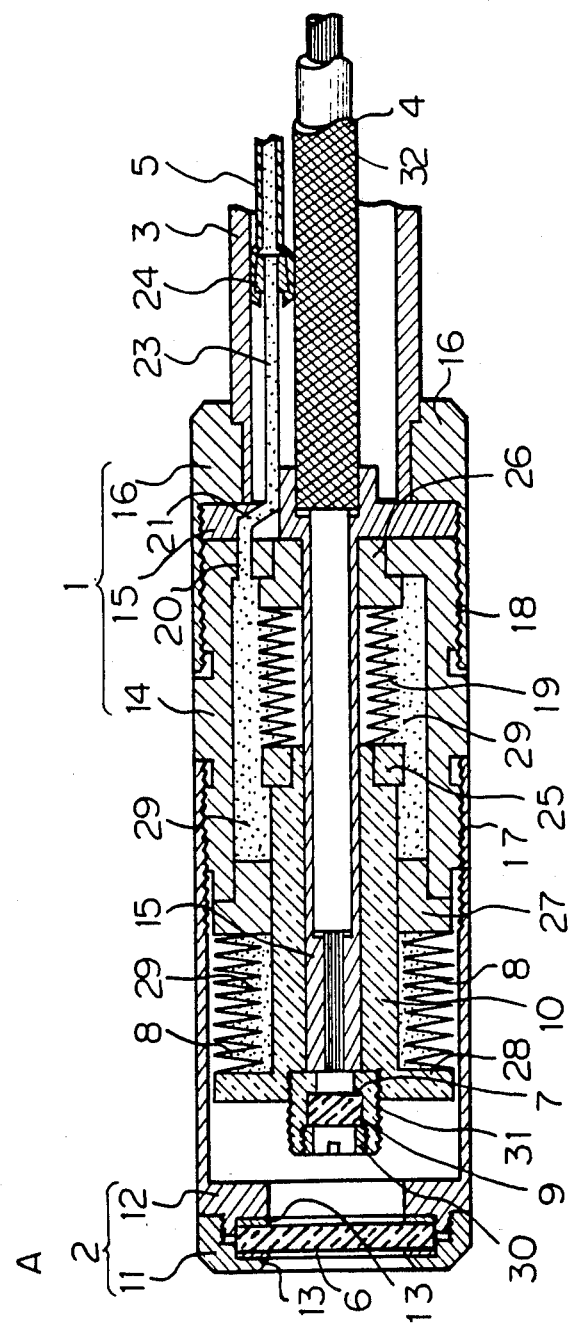
FIG. 8 is a longitudinal sectional view of the image pick-up adapter in the assembled state.
Figure 9:
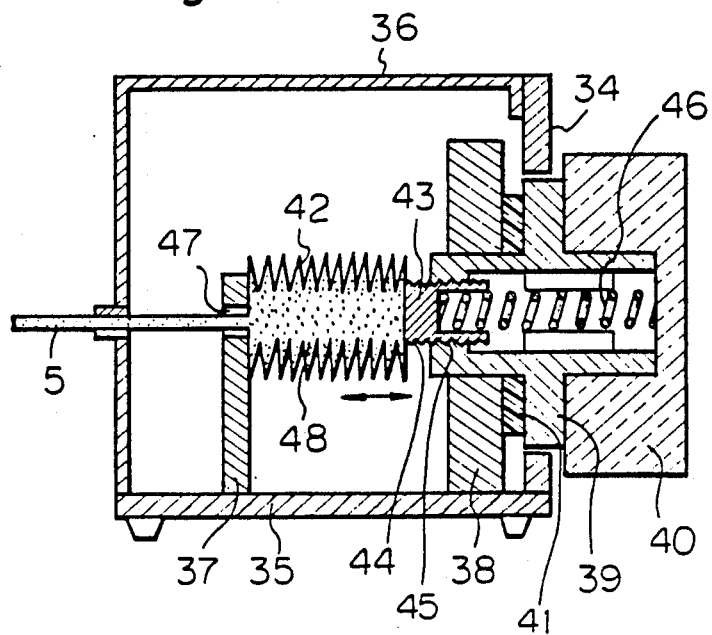
FIG. 9 is a longitudinal sectional view of a hydraulic pressure drive adapter.
Figure 10:
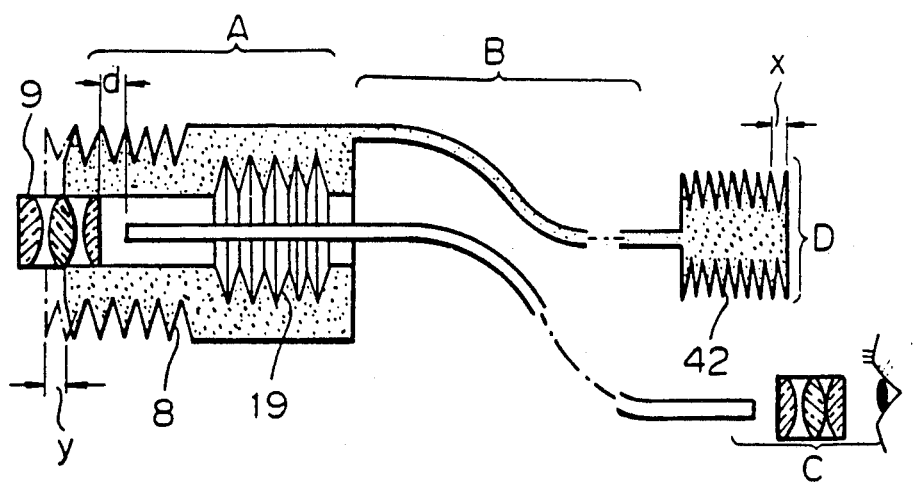
FIG. 10 is a view showing an oil system and image fiber system extending from the image pick-up adapter to the hydraulic pressure drive adapter of the image observation system through the transmission section and picture receiving adapter thereof.

FIG. 7 is an exploded perspective view showing an embodiment of an image observation system according to the present invention, FIG. 8 is a longitudinal sectional view of the image pick-up adapter in the assembled state, FIG. 9 is a longitudinal sectional view of a hydraulic pressure drive adapter, and FIG. 10 is a schematic view showing an image transmission section and hydraulic pressure system.

The image pick-up adapter comprises an adapter main body 1 and a cap 2. Connected to the back end of the adapter main body 1 is a flexible pipe 3 in which there are provided an image fiber 4, and an oil tube 5 for supplying hydraulic pressure. The cap 2, which is for protecting the image fiber and the lens, has a glass window 6 provided at its front end so as to be capable of approaching an object under observation. A lens holder 7, which is capable of being advanced and retracted by a first bellows 8, is provided at the front end of the adapter body 1. Fixed within the lens holder 7 is an image pick-up lens 9. The lens holder 7 is in turn held at the front end of a lens holder supporting cylinder 10, as shown in FIG. 8, the cylinder 10 being freely slidable in the axial direction.

The cap 2 of the image pick-up adapter includes a glass window supporting cover 11 and a window supporting cylinder 12 which serve to hold the window glass 6 securely from both sides through the intermediary of the glass retaining rings 13 disposed on either side of the window glass 6. The glass supporting cover 11 is screwed securely onto the window supporting cylinder 12.

The adapter body 1 comprises an oil reservoir cylinder 14, an image fiber holder 15, and a pipe supporting ring 16. The window supporting cylinder 12 of the cap 2 and the oil reservoir cylinder 14 are screwed together at a threaded portion 17. Likewise, the oil reservoir cylinder 14 and pipe supporting ring 16 are screwed together at a threaded portion 18 to grasp and hold a disk-shaped portion of the image fiber holder 15.

The image fiber holder 15, which comprises the abovementioned disk-shaped portion and a forwardly extending, slender cylindrical portion, interiorly supports the image fiber 4 at a portion thereof from which a sheath 32 has been stripped away. The image fiber holder 15 is affixed to the adapter body 1 and, hence, is incapable of movement.

A second bellows 19, which is made of metal, is provided on the outer side of the cylindrical portion of the image fiber holder 15 at the back end thereof.

The first bellows 8, second bellows 19, oil reservoir cylinder 14 and lens holder supporting cylinder 10 define a sealed space which serves as an oil chamber 29. Communicating passages 20, 21 are bored through the oil reservoir cylinder 14 and image fiber holder 15, and an oil pipe 23 is connected thereto so as to be communicated with the interior of the oil chamber 29 in order that oil may be fed into the chamber. The other or rear end of the oil pipe 23, made of metal, has a ring 24 into which the end portion of the oil tube 5 is fitted. The ring 24 prevents the pipe 23 and tube 5 from separating.

The second bellows 19 has its front end welded to a ring 25 at the back end of the lens holder supporting cylinder 10, and has its back end welded to a bellows seat 26. The second bellows 19, ring 25 and bellows seat 26 are fabricated in advance as a unitary body which, at the time of assembly, is installed by being engaged with step portions formed on the lens holder support cylinder 10 and oil reservoir cylinder 14. The first bellows 8 is similarly welded at its front and back ends to a flange 28 on the lens holder supporting cylinder 10 and to a joint 27, respectively.

The bellows 8, 19 are formed in the following manner: Annularly shaped sheets of rolled metal are pressed in such a manner that the sheet cross-section (in the radial direction) is formed into an S- or Y-shaped configuration. The shaped sheet members are then overlapped and welded on their inner and outer peripheries to successively join neighboring members.

The above mentioned oil chamber 29 is defined by the inner side of the first bellows 8, the outer side of the second bellows 19, the outer side of the lens holder supporting cylinder 10, and the inner side of the oil reservoir cylinder 14. The arrangement is such that oil can be introduced into the space between the joint 27 and the lens holder supporting cylinder 10. This can be accomplished quite easily by providing the joint 27 with a passage for the oil flow.

In operation, feeding oil into the oil chamber 29 through the oil pipe 23 causes the lens holder supporting cylinder 10 to advance, i.e., to move leftward in FIG. 8, thereby expanding the two sets of bellows 8, 19. Conversely, withdrawing oil from the oil chamber 29 causes the bellows 8, 19 to contract so that the lens holder supporting cylinder 10 is retracted, i.e., moved rightward in FIG. 8.

The lens 9 at the front of the lens holder 7 is fixed by a lens retainer 30. The lens holder 7, the outer periphery of which has threads 31, is screwed securely into the front end of the lens holder supporting cylinder 10. In the attitude shown in FIG. 8, the lens holder 7 is in abutting contact with the front end of the image fiber holder 15 and, hence, is in the fully retracted position.

To manipulate the image pick-up adapter A having the foregoing construction, the manually operated side of the fiberscope is provided with a hydraulic pressure adapter D, a longitudinal sectional view whereof is shown in FIG. 9. The hydraulic pressure adapter D is adapted to expand and contract a bellows 42 provided at the other end of the oil tube 5. This will now be described in further detail with reference to FIG. 9.

A front panel 34, bottom plate 35 and cover 36 define a box in which support plates 37. 38 are fixedly secured so as to lie in parallel. The front panel 34 has an opening in which a rotary disk 39 is inserted and rotatably supported by the support plate 38. Attached to the outer side of the rotary disk 39 is a drive knob 40. Interposed between the support plate 38 and rotary disk 39 is a spacer 41 having a low coefficient of friction. The bellows 42, which is filled with oil 48 and capable of being freely expanded and contracted, is provided between the support plates 37, 38 and is connected to the oil tube 5 so that the two are in communication. A bellows shaft 43 is affixed to the back of the bellows 42 and is provided with male threads 44. The front of the rotary disk 39 is provided with corresponding female threads 45. The bellows shaft 43 is screwed into the rotary disk 39 by virtue of the threads 44, 45.

When the drive knob 40 is turned, the bellows shaft 43 is displaced in the axial direction at its threaded portion and either expands or contracts the bellows 42, depending upon the direction in which the knob 40 is rotated. Contraction of the bellows 42 forces the enclosed oil 48 from the bellows into the oil pipe 5, whereas expansion of the bellows 42 draws in oil through the oil pipe.

The front end of the bellows 42 is secured to the support plate 37 at a tube joint 47. Interposed between the drive knob 40 and bellows shaft 43 is a spring 46 which suppresses backlash of the threadedly engaged portions of the shaft and rotary plate 39 so that the bellows 42 may be moved back and forth smoothly.

FIG. 10 is a schematic view illustrating the hydraulic pressure system between the image pick-up adapter A and the hydraulic pressure drive adapter D, as well as the image fiber system between the image pick-up adapter A and the picture receiving adapter C. In the present invention, the transmission section B comprises the flexible pipe 3 (FIG. 7) accommodating the hydraulic pressure tube 5 and image fiber 4.

When the bellows 42 of the drive adapter D is expanded and contracted, hydraulic pressure is uniformly transmitted through the oil tube 5 to expand and contract the first and second bellows 8, 19. Let x represent the displacement of the drive adapter bellows 42, and let y represent the accompanying displacement of the first bellows 8 of the image pick-up adapter A. Since the image pick-up lens 9 is secured to the first and second bellows 8, 19, the distance d between the end face of the image fiber and the image pick-up lens will vary by an amount equivalent to the displacement y of the first bellows 8.

FIG. 11 is a schematic view showing the overall image observation system of the present invention. As with the prior-art example of FIG. 1, the image observation system of the invention comprises the image pick-up adapter A, transmission section B and picture receiving adapter C. Unlike the prior art, however, the hydraulic pressure drive adapter D is provided, and the picture receiving adapter C is connected to the drive adapter D by a flexible pipe 49, which accommodates the oil tube 5. In using the system, the operator brings his eye to the picture receiving adapter C to observe the enlarged image of the object under investigation and, by turning the drive knob 40, focuses the image observed.

FIG. 12 is a graph of experimental results obtained using an experimental model of the image observation system of the invention. The graph shows the relation between the traveling distance x of the drive bellows 42 and the displacement y of the image pick-up lens 9. The traveling distance x (mm) is plotted along the horizontal axis, the displacement y (mm) is plotted along the vertical axis, and the oil tube length is 10 m. It will be appreciated from the graph that the relation between x and y exhibits good linearity. Experiments showed that there is almost no time delay between manipulation of the adapter D and response at the adapter A, and that the image pick-up lens moves in a smooth manner. In addition, it was found that the system is capable of operation with oil tube lengths of up to 100 m.

In the arrangement of FIG. 8, the first bellows 8 and second bellows 19 are disposed side by side to reduce the diameter of the image pick-up adapter. Arranging the two bellows one inside the other at the same position, i.e., in a coaxial manner, would enlarge the adapter diameter excessively.

The embodiment of the image observation system described hereinabove is devoid of a mechanism for introducing an illuminating light beam. It goes wit2hout saying that the present invention is applicable to a fiberscope equipped with a light guide for illumination of an object in a dark environment. Such an embodiment of the invention will now be described.

FIG. 13 is a longitudinal sectional view of an image pick-up adapter in an image observation system equipped with a light guide, FIG. 14 is a sectional view taken along line XIV—XIV of FIG. 13, and FIG. 15 is a front view of the adapter. The image pick-up adapter A is provided with a light guide 80 accommodated within the adapter main 81 and a cap 82 so as to lie parallel to the image fiber 4. The light guide 80 is made of a transparent plastic such as PMMA (polymethyl methacrylate). Attached to the rear of the adapter is the flexible pipe 3 for protecting the image fiber 4 and the light guide 80, the latter being fixed within the adapter A by a light guide holder 83. An image pick-up lens 84, disposed directly in front of the image fiber 4, is adapted to be moved back and forth by a first bellows 85, second bellows 86 and third bellows 87.

Though three bellows are used in order to accommodate the two bodies comprising the light guide and image fiber, the operation of the embodiment is the same as that of the first embodiment. In this case, the three bellows define an oil-filled chamber 88 and expand or contract in response to hydraulic pressure.

Transparent windows 89, 90 are attached to the cap 82 in front of the light guide 80 and image pick-up lens 84, respectively.

The manually operated side of the system is provided with means for producing an illuminating light beam and means for adjusting the intensity of the light beam so that the object under observation can be illuminated with a controlled amount of light. When the image of the object comes into view, the position of the image pick-up lens is adjusted in such a manner that the image is formed on the end face of the fiber bundle by the lens.

The present invention is not limited to displacement of an image pick-up lens but can also be used to rotate a mirror or shift the pointing direction of the image pick-up adapter in order to vary the direction of the visual field. Such an arrangement is shown in the perspective view of FIG. 16, which exemplifies a mechanism for rotating the visual field by the rotation of a mirror. To simplify the description, the case surrounding the image pick-up adapter is deleted from the drawing. The arrangement is provided with a bellows 91 the interior of which communicates with the oil tube 5. The bellows 91 has a front end face 92 which is stationary and a rear end face capable of being advanced and retracted. Secured to this movable end face is a rack 93 formed to include inclined teeth. A helical gear 94 meshes with the rack 93, and a pinion 95 meshes with the gear 94. A mirror 96 having a reflective surface 97 is secured to the pinion 95.

When the bellows 91 is expanded and contracted, the pinion 95 is rotated back and forth by the gear mechanism to alter the orientation of the reflective surface 97 of mirror 96. This in turn changes the angle at which an incident light beam 98 strikes the reflective surface 97, thereby making it possible to rotate the visual field.

Figure 17:
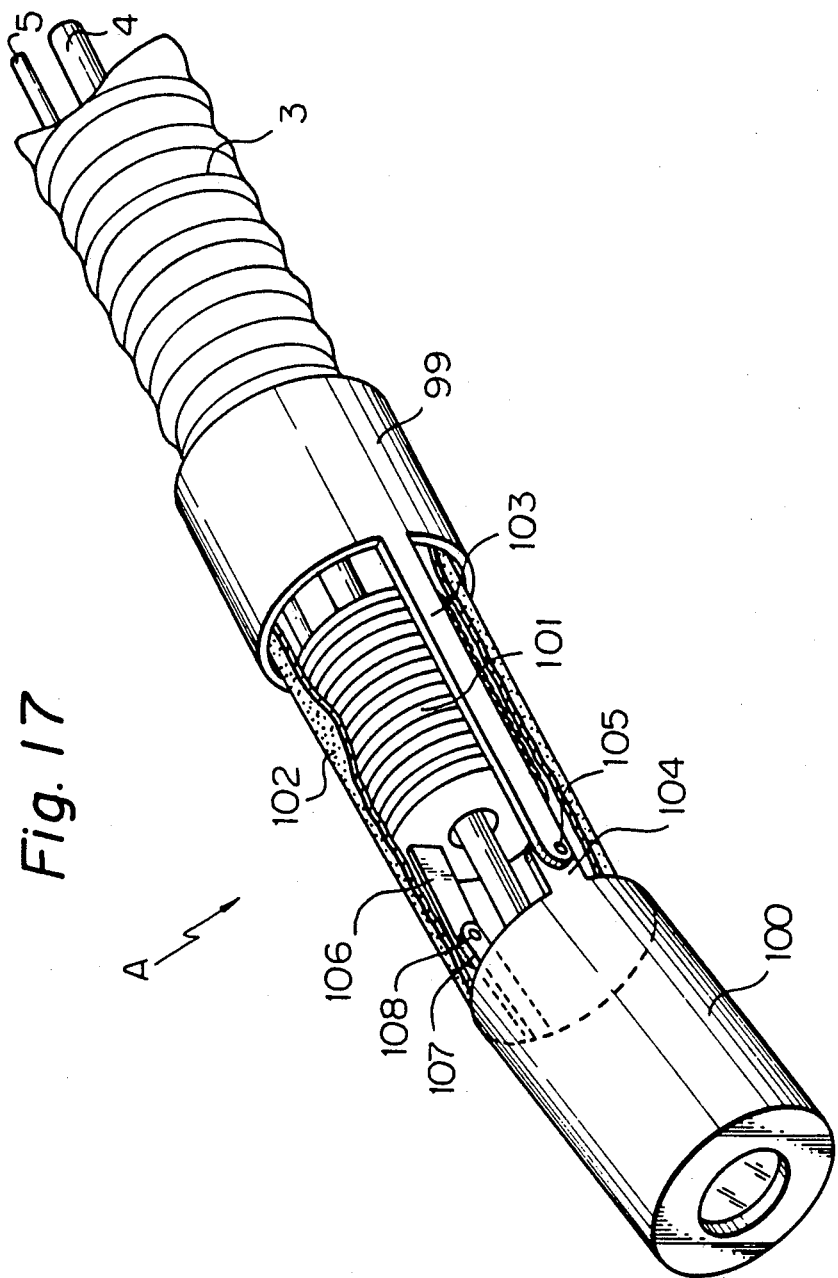
FIG. 17 is a perspective view of an embodiment of the invention having an image pick-up adapter bending mechanism.

The concept of the present invention can be used to bend the tip of the image pick-up adapter A at will, as will now be described in conjunction with the perspective view of FIG. 17 illustrating an embodiment having a mechanism for bending the image pick-up adapter.

In FIG. 17, the image pick-up adapter A is divided into a fixed cylinder 99 and a cylinder 100 which is bendable relative to the fixed cylinder 99, the cylinder 100 serving as the tip of the adapter. Provided between these two cylinders is a bellows 101 capable of being expanded and contracted. A rubber cover 102 covers the portion of the adapter between the cylinders. The bendable cylinder 100 has a support portion 104 which is pivotally connected by a pin 105 to a stationary bracket 103 extending forwardly from the fixed cylinder 99. A movable bracket 106 secured to the bellows 101 is pivotally connected by a pin 108 to a support portion 107 of the cylinder 100. With such an arrangement, expanding or contracting the bellows 101 causes the movable bracket 106 to advance or retract, in response to which the cylinder 100 is bent back and forth to enable a change in the direction of observation.

According to the present invention as described and illustrated hereinabove, an image pick-up adapter is provided with one or a plurality of bellows which, by being moved, cause displacement of an optical element constituting part of the adapter. It should be noted that the invention is applicable to (1) a zoom mechanism wherein the focal distance of an image pick-up lens is changed by moving lenses in a lens combination to change a specific lens spacing, (2) diaphragm mechanism, and (3) a mechanism for opening and closing a protective cap for the purpose of excluding dust. Other applications of the invention are possible as well.

According to the invention, a bellows is filled with a liquid such as oil or with a gas and is expanded or contracted by the resulting fluid pressure to displace the optical element of the image pick-up adapter. Such an arrangement provides a number of advantages, specifically:

(1) The invention is suitable for remote control of an image pick-up adapter mechanism in fiberscopes of great length.

(2) The invention is suitable for remote control of an image pick-up adapter mechanism in fiberscopes having a small bending radius.

(3) Since positioning is decided by balance between bellows flexibility and hydraulic pressure, an extremely fine adjustment is possible in the focusing mechanism of an image pick-up adapter.

(4) Very quick response is possible when an incompressible fluid is used as the working fluid.

(5) Smooth movement is achieved by an arrangement free of the large frictional forces encountered in a wire-operated configuration.

(6) Use is made of a bellows in which the working fluid is enclosed. This affords excellent durability without risk of seal failure.

(7) Reliance upon a bellows eliminates hysteresis and, hence, provides good linearity between input and output, namely a highly linear x-y relation.

As many apparently widely different embodiments of the present invention can be made without departing from the spirit and scope thereof, it is to be understood that the invention is not limited to the specific embodiments thereof except as defined in the appended claims.

I claim:

1. An image observation system which comprises:
   an image fiber for transmitting an image;
   an image pick-up adapter mounted on one end of said image fiber and having an image pick-up lens unit for forming an image of an observed object on an end face of said image fiber, and bellows means capable of expansion and contraction, for displacing said image pick-up lens unit relative to the end face of said image fiber while the optic axis of said image pick-up lens unit is held substantially perpendicular to said end face;
   a picture receiving adapter mounted on the other end of said image fiber for observing or photographing an image transmitted to the other end of said image fiber;
   a fluid pressure drive adapter for varying fluid pressure internally of said bellows for expanding and contracting said bellows; and
   a fluid transfer tube communicating said fluid pressure drive adapter and said bellows.

2. The image observation system according to claim 1, wherein said image pick-up adapter includes an inclined mirror rotatable about the optic axis of an image pick-up lens, and further bellows for rotating said mirror, the visual field of the image pick-up lens being rotated by movement of said further bellows.

3. The image observation system according to claim 2, wherein expansion and contraction of said further bellows is converted into rotational displacement of said mirror by a rack movable along the expanding and contracting direction of said further bellows, a pinion rotatable about the axis of rotation of said mirror, and a helical gear meshing with said rack and said pinion.

4. The image observation system according to claim 1, wherein said image pick-up adapter includes a first fixed cylinder and a second cylinder attached to said first cylinder so as to be bendable relative thereto, the pointing direction of said second cylinder being changed by an additional bellows.

5. An image observation system comprising:
   an image fiber for transmitting an image;
   an image pick-up adapter, mounted on one end of said image fiber and having an image pick-up lens unit for forming an image of an observed object on an end face of said image fiber, a first bellows of a prescribed diameter for holding an image pick-up lens of said pick-up lens unit, and a second bellows of a diameter smaller than said prescribed diameter, said first and second bellows defining a sealed chamber, said image fiber being held by said second bellows, said image fiber being displaced by the action of said second bellows;
   a picture receiving adapter, mounted on the other end of said image fiber for observing or photographing an image transmitted to the other end of said image fiber;
   a fluid pressure drive adapter for varying fluid pressure internally of said first bellows for expanding and contracting it; and
   a fluid transfer tube communicating said fluid pressure drive adapter and said first bellows.

6. The image observation system according to claim 5, further comprising a light guide for transmitting an illuminating light beam from said image pick-up adapter to illuminate the object being observed, and a third bellows for holding said light guide.

* * * * *